(12) United States Patent
Mansfield

(10) Patent No.: US 6,381,114 B1
(45) Date of Patent: Apr. 30, 2002

(54) INTEGRATED CURRENT SOURCE FEEDBACK AND CURRENT LIMITING ELEMENT

(75) Inventor: William M. Mansfield, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/540,654

(22) Filed: Mar. 31, 2000

(51) Int. Cl.[7] .................................................. H02H 9/00
(52) U.S. Cl. ....................................................... 361/58
(58) Field of Search ............................. 361/58, 56, 94, 361/18; 323/267; 307/131

(56) References Cited

U.S. PATENT DOCUMENTS

| | | | | |
|---|---|---|---|---|
| 5,153,802 A | * | 10/1992 | Mertz et al. ................... | 361/18 |
| 5,335,133 A | * | 8/1994 | Bishop et al. ................. | 361/56 |
| 5,365,420 A | | 11/1994 | Cadman ......................... | 363/50 |
| 5,499,154 A | * | 3/1996 | Cullison ......................... | 361/18 |
| 5,534,768 A | * | 7/1996 | Chavannes et al. .......... | 323/267 |
| 5,539,606 A | * | 7/1996 | Covi et al. ..................... | 361/94 |
| 5,723,915 A | * | 3/1998 | Maher et al. ................. | 307/131 |
| 6,108,183 A | * | 8/2000 | Beene ........................... | 361/94 |

FOREIGN PATENT DOCUMENTS

| | | |
|---|---|---|
| DE | 37 04 982 A | 8/1988 |
| DE | 39 31 537 A | 4/1991 |

* cited by examiner

*Primary Examiner*—Peter S. Wong
*Assistant Examiner*—Pia Tibbits
(74) *Attorney, Agent, or Firm*—Faegre & Benson LLP

(57) ABSTRACT

A circuit for supplying power to an intrinsically safe circuit having a power supply and output terminals includes an integrated current source feedback and current limiting element. Voltage limiting circuitry between the power supply and the output terminals limits the voltage across a load. Current limiting circuitry includes barrier resistors which convert current to voltage for input to an operational amplifier comparing a reference voltage with the voltage level representing the load current and providing a control input signal to a transistor for limiting a current applied to the load.

17 Claims, 2 Drawing Sheets

INTEGRATED CURRENT SOURCE FEEDBACK AND CURRENT LIMITING ELEMENT

FIELD OF THE INVENTION

This invention relates to a power supply for an intrinsically safe loads. More particularly, this invention relates to circuitry that limits the current supplied to the load to meet intrinsically safe standards.

Problem

Electronic devices are often used in hazardous environments containing volatile material. It is often a problem that a spark or heat from the electronic devices can cause the volatile material to ignite. Therefore, makers of electronic devices for use in these hazardous environments must provide some protection to ensure that the electronic devices do not ignite the volatile material.

One such form of protection is to make a circuit intrinsically safe. Intrinsically safe standards are set by regulating authorities such as the UL in the United States, CENELEC in Europe, CSA in Canada, and TIIS in Japan. In order to be intrinsically safe the current, power, and voltage through the circuit are limited to levels that prevent ignition of the volatile material from a spark or heat generated by the circuit.

It is a problem to deliver electricity to an intrinsically safe device. The power, voltage and current of the electricity are limited to the levels insufficient to ignite the volatile material. Therefore, components are needed in the power supply to limit the power, voltage, and current delivered to the intrinsically safe device.

In a conventional power supply, voltage is limited by connecting one or more zener diodes between supply line connecting a power supply to output terminals. The zener diodes limit voltage to V. Current limiting is provided by connecting a resistor having a resistance of R in series with a high potential output terminal. The resistor limits current to V/R. Power is controlled by the limiting of current and voltage.

The limiting components, i.e. the diodes and resistors, must be protected to prevent the components from exceeding published rating in the event of a fault. A fuse is typically added to the circuit to limit the amount of current that can be delivered to the components. A fuse is chosen that has a rating that ensures power dissipation ratings are not exceeded.

Although not required for intrinsical safety standards, a current limiting circuit is often added to the power supply circuit to prevent the fuse from blowing. There many current limiting topologies that may be employed on either a high potential or low potential side of a power supply. Most current limiting topologies include a resistor to convert current to voltage in order to provide feedback that is proportional to current. A comparison to a reference voltage is performed. The impedance of a series element is adjusted in response to the comparison. A problem with adding a current limiting circuit is that the conversion of current to voltage adds to the total output resistance and causes additional voltage loss beyond the voltage loss required to meet intrinsic safety standards.

Solution

The above and other problems are solved and an advance in the art is made by power supply having an integrated current source feedback and current limiting element in accordance with this invention. One advantage of an integrated current source feedback and current limiting element is the voltage loss may be minimized to the voltage that must be limited for intrinsic safety standards. A second advantage is that the number of components of a power supply circuit are reduced which lowers the cost of producing a power supply.

In accordance with the present invention, the function of a current conversion resistor in a power limiting circuit is combined with the function of barrier output resistance. This allows output resistance to be no more that the resistance required to prevent ignition of a hazardous material. The combination of function is provided by moving parts of the current limiting circuit to a point after the barrier resistance. In particular, a variable impedance device is moved to a point after the barrier resistance. One example of a variable impedance device is a MOFSET transistor.

When a MOFSET transistor is moved, there are two new paths to the output terminals. A first is a an op-amp control output and a feedback from a feedback from the barrier resistance. An input to an operational amplifier and the gate for the MOFSET transistor are of high impedance and relatively large value resistors compared to a barrier resistor placed in each of these paths. The total barrier resistance in a combination of resistor placed in a path with inputs into the MOFSET gate and operational amp input. This limits the power supply to an output resistance which is negligibly lower than the barrier resistance alone.

An aspect of the invention comprises an intrinsically safe circuit configured for supplying power to a load connected to a first output terminal and a second output terminal;
  said circuit comprising;
    a power supply source;
    a voltage limiter connected in parallel with said power supply source to limit the maximum voltage generated by said power supply source;
    a connection between a first side of said voltage limiter and said first terminal;
    a current limiter comprising;
      a reference voltage;
      a variable impedance;
      a barrier resistor;
      a second side of said voltage limiter is connected in series with said barrier resistor and said variable impedance to said second output terminal;
      said current limiter limits a current delivered to said load via said terminals to a maximum current level in response to a comparison of said reference voltage with a voltage across said barrier resistor representative of the current delivered to said load.

Preferably the intrinsically safe circuit further comprises a fuse connected between a positive voltage side of the power supply source and the voltage limiting circuit.

Preferably the voltage limiter comprises a diode that has a cathode connected to the positive side of the power supply source and further has an anode connected to the negative side of the power supply source.

Preferably the diode comprises a zener diode.

Preferably the current limiter and variable impedance comprises:
  said variable impedance comprises a transistor for controlling the current level through the load, said transistor is connected to the second output terminal;
  said operational amplifier controls the impedance of the transistor and has an output connected to a gate of the transistor, and further has a first input connected to a voltage representing said load current and further has a second input connected to said reference voltage;

a voltage divider including said barrier resistor for generating a voltage level that is representative of said load current, said voltage divider is connected to the first input of the operational amplifier, and to the negative side of the power supply source.

Preferably the current limiter further comprises a resistor connected between the output of the operational amplifier and the gate of the transistor.

Preferably the current limiting circuit has a transistor comprising Metal Oxide Semiconductor Field Effect Transistor (MOSFET).

Preferably the current limiter has a voltage divider comprising:

a first resistor connected between the first input of the operational amplifier and drain of the transistor; and a second resistor having one end connected to said drain and a second end connected to the negative side of the power supply source.

Preferably the intrinsically safe circuit is characterized in that the load comprises electronics of the Coriolis flowmeter having a signal conditioner circuit for generating a drive signal and for receiving pick-off signals, said signal conditioner circuit is connected to the first and second output terminals of the intrinsically safe circuit.

Preferably the signal conditioner circuit comprises:

a drive circuit for generating said drive signal, said drive circuit is connected to the first and second output terminals of the intrinsically safe circuit; and a conditioning circuit for receiving the pick-off signals, said conditioning circuit has an input connected to an output of the drive circuit.

Another aspect comprises a method of operating an intrinsically safe circuit for supplying power to a load;

said method comprises the steps of;

connecting a voltage limiter connected in parallel with a power supply source to limit the maximum voltage generated by said power supply source;

extending a connection between a first side of said voltage limiter and a first terminal;

connecting a second side of said voltage limiter in series with a barrier resistor and a variable impedance to a second output terminal;

with a barrier resistor and said variable impedance to said second output terminal;

limiting a current delivered to said load via said terminals to a maximum current level in response to a comparison of a reference voltage with a voltage across said barrier resistor representative of the current delivered to said load.

Preferably the step of limiting the voltage level includes operating a diode to limit said voltage.

Preferably the step of operating a diode includes the step of operating a zener diode.

Preferably the method further comprises the steps of:

applying intrinsically safe power from said terminal to a drive circuit of a Coriolis flowmeter; and generating a drive signal with the drive circuit in response to the reception of said power.

Preferably the method further comprises the step of applying pick-off signals to a conditioning circuit of said Coriolis flowmeter in response to the reception of said power.

Preferably the method is characterized in that the step of limiting the current comprises the steps of:

operating a voltage divider to generate a voltage level that is representative of the load current;

operating the operational amplifier to compare a reference voltage with said voltage level representing the load current; and extending a signal from an output of the operational amplifier to a control input of a transistor for limiting a current to a maximum level through the load.

Preferably the method is characterized in that the step of operating the transistor includes the step of operating a MOSFET.

DESCRIPTION OF THE DRAWINGS

The above and other features in accordance with this invention can be understood from the Detailed Description and the following drawings.

DETAILED DESCRIPTION

Figure 1:
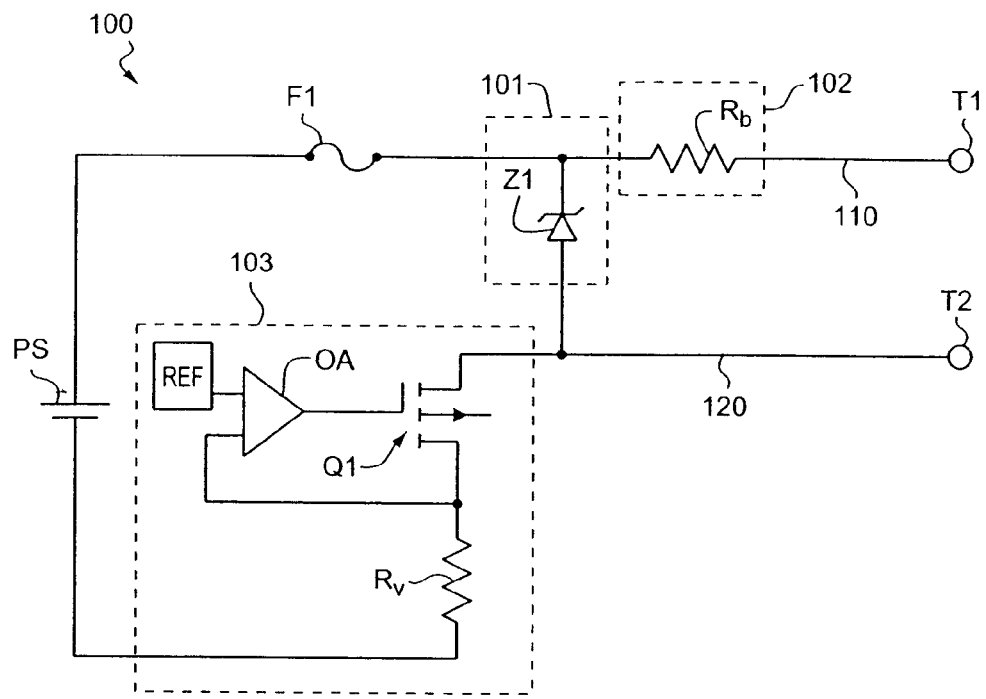
FIG. 1 illustrating a prior art power supply for an intrinsically safe load.

A power supply in accordance with this invention allows the total output resitance to be no more than is required to prevent ignition of volatile material in a hazardous environment. A typical intrinsically safe power supply 100 is illustrated in FIG. 1 to show the differences between a power supply in accordance with the present invention and a typical intrinsically safe power supply.

Prior Art intrinsically safe power supply 100 delivers sufficient power to a load to ensure that the load may operate properly while limiting the worst case voltage, current, and power to levels insufficient to cause ignition of a hazardous material. Voltage limiting circuitry 101 limits the voltage across the load. Voltage limiting circuitry 101 is a zener diode Z1 connected between paths 110 and 120. One skilled in the art will recognize that more than one zener diode may be connected between paths 110 and 120 to limit the voltage. For purposes of this discussion, voltage limiting circuitry 101 limits the magnitude of the voltage across a load (Not Shown) to $V_z$.

Instantaneous current limiting circuitry 102 limits instantaneous current applied to a load. In power supply 100, instantaneous current limiting circuitry includes resistor Rb which is connected in series with output terminals T1 and T2. In this embodiment, resistor Rb is connected between positive output terminal T1 and power source PS along path 110. This limits the instantaneous current to $V_z/R_b$ where $R_b$ is the resistance of resistor Rb. Power delivered to the load (Not Shown) is limited by the limits of voltage and current.

Fuse F1 is connected between power source Ps and positive output terminal T1 to protect voltage limiting circuitry 101 and instantaneous current limiting circuitry 102 in case of a fault in the circuit. Fuse F1 prevents voltage limiting circuitry 101 and instantaneous current limiting circuitry 102 from exceeding published rating of components.

Average current limiting circuit 103 prevents fuse F1 from blowing in the event that output terminals T1 and T2 are shorted. There are many well known current limiting topologies that can be used to provide average current limiting circuit 103. In powersupply 100, average current limiting circuit is provided by the following components. A source of transistor Q1 is connected to negative output terminal T2. A drain of transistor Q1 is connected to a resistor Rv. Resistor Rv converts the current through it to a voltage to provide a feedback voltage that is proportional to current through it. An output of operational amplifier OA is connected to the gate of transistor Q1 and a signal is applied to the gate based on a comparison with voltage "REF" to adjust the impedance of transistor Q1. The current limit is set to $I_{lim}=V_{ref}/Rv$ where $I_{lim}$ is the current limit, $V_{ref}$ is the reference voltage, Ref, and Rv is the resistance of the resistor Rv.

One skilled in the art will recognize that values of components in power supply 100 are constrained by tables and formulas that characterize power and energy at which an ignition of a volatile material occurs. In normal operation, the load (not Shown) is connected to output terminals T1 and T2, draws current and voltage is lost across an output resistance. In order to maximize power transfer, it is desired to limit output resistance to that needed to prevent ignition of the volatile material.

It is a problem that adding average current limiting circuit 103 results in additional voltage loss beyond the voltage limits for preventing ignition. Voltage is lost because the voltage conversion resistance add to the total output resistance.

Figure 2:
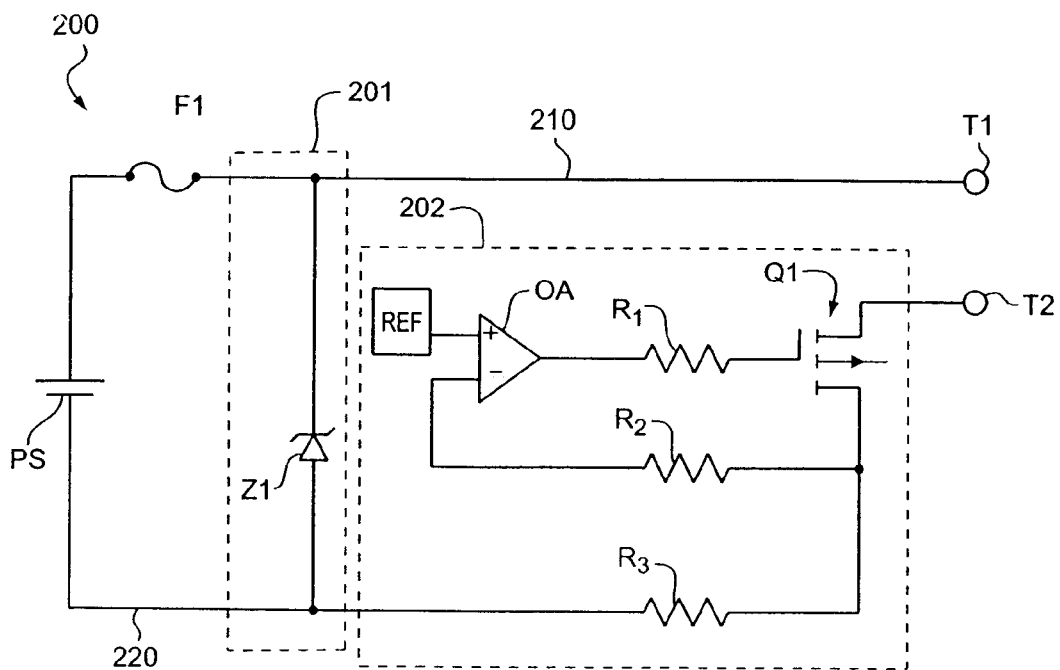
FIG. 2 illustrating a power supply for an intrinsically safe load in accordance with this invention.

Power supply 200 illustrated in FIG. 2 solves this problem in accordance with the present invention. Power supply 200 is an intrinsically safe power supply that limits current, power and voltage delivered to a load (Not Shown). Voltage limiting circuitry 201 limits the voltage across the load. In power supply 200, voltage limiting circuitry 201 is a zener diode Z1 connected between paths 210 and 220. One skilled in the art will recognize that more than one zener diode may be connected between paths 210 and 220 to limit the voltage. For purposes of this discussion, voltage limiting circuitry 201 limits the voltage across a load (Not Shown) to $V_z$.

In accordance with the present invention, the functions of limiting the instantaneous and average current are combined into one circuit. The use of one circuit for both functions allows the total output resistance to be reduced to the amount of resistance required to prevent ignition of a volatile material. This is accomplished by moving components of the average current limiting circuits to a point after the instantaneous current limiting circuitry. In particular, the variable impedance device, transistor Q1 is moved to a point after the barrier circuitry. The location of the variable impedance device creates two new paths to output terminals T1 and T2. The new paths are the operational amplifier OA output and the feedback from a voltage divider formed by resistors R2 and R3. The total output resistance is a parallel combination of resistors along the two new paths and path 210 to power source PS.

In power supply 200, the current limiting circuit 202 in accordance with the present invention is provided in the following manner. A source of Metal-Oxide Semiconductor Field-Effect Transistor, or MOSFET, transistor Q1 is connected to negative output terminal T2. A barrier resistor R3 is connected along path 220 between transistor Q1 and power source PS. A second resistor R2 is connected between a drain of transistor Q1 and an input of operational amplifier OA to generate a comparison voltage. Operational amplifier OA has a lower input connected to resistor R2 and it receives a reference voltage Ref on its upper input. Operational amplifier performs a comparison of the voltage on the inputs and applies a current to a gate of transistor Q1 to adjust the impedance of transistor Q1. Resistor R1 is connected between the output of operational amplifier OA and the gate of transistor Q1. Those skilled in the art will recognize that the values of Resistors R1, R2, and R3 may be large and that the total output resistance is a combination of the three resistors in parallel which is negligibly smaller than the value of the barrier resistance. Thus power transfer is optimized.

Figure 3:
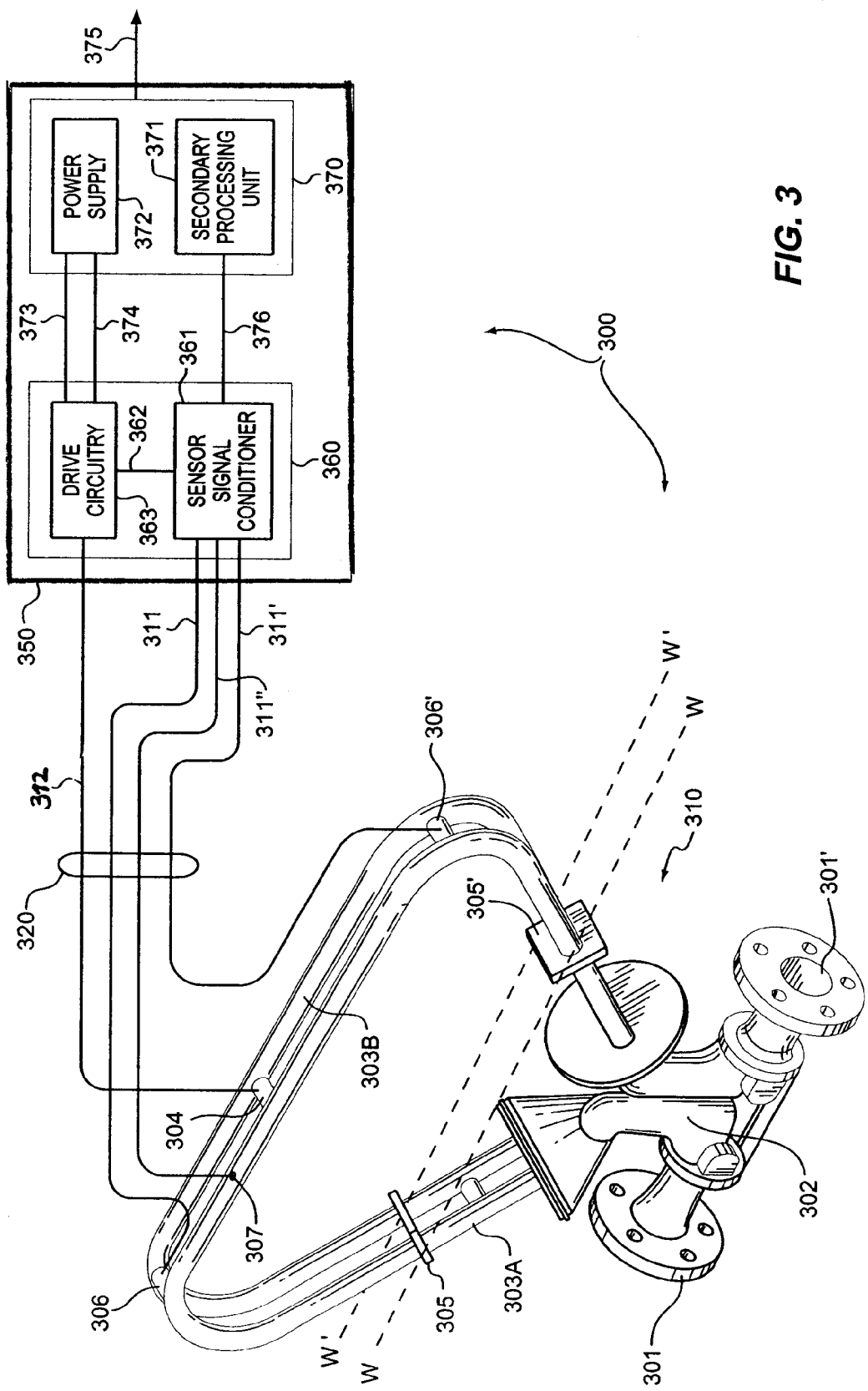
FIG. 3 illustrating a Coriolis flow meter incorporating a power supply in accordance with this invention into meter electronics.

One device where power supply 200 is needed is a power supply for electronics in a Coriolis flowmeter operating in a hazardous environment. FIG. 3 illustrates a Coriolis flow meter 300 incorporating power supply 200. Coriolis flowmeter 300 includes a flowmeter assembly 310 and meter electronics 350. Meter electronics 350 are connected to a meter assembly 310 via leads 320 to provide for example, but not limited to, density, mass-flow-rate, volume-flow-rate, and totalized mass-flow rate information over a path 375. A Coriolis flowmeter structure is described although it should be apparent to those skilled in the art that the present invention could be practiced in conjunction with any apparatus having intrinsically safe circuits requiring an intrinsically safe power supply.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 310 includes a pair of flanges 301 and 301', manifold 302 and conduits 303A and 303B. Driver 304, pick-off sensors 306 and 306', and temperature sensor 307 are connected to conduits 303A and 303B. Brace bars 305 and 305' serve to define the axis W and W' about which each conduit oscillates.

When Coriolis flowmeter 300 is inserted into a pipeline system (not shown) which carries the process material that is being measured, material enters flowmeter assembly 310 through flange 301, passes through manifold 302 where the material is directed to enter conduits 303A and 303B. The material then flows through conduits 303A and 303B and back into manifold 302 from where it exits meter assembly 310 through flange 301'.

Conduits 303A and 303B are selected and appropriately mounted to the manifold 302 so as to have substantially the same mass distribution, moments of inertia and elastic modules about bending axes W—W and W'—W', respectively. The conduits 303A–303B extend outwardly from the manifold in an essentially parallel fashion.

Conduits 303A–303B are driven by driver 304 in opposite directions about their respective bending axes W and W' and at what is termed the first out of phase bending mode of the flowmeter. Driver 304 may comprise any one of many well known arrangements, such as a magnet mounted to conduit 303A and an opposing coil mounted to conduit 303B and through which an alternating current is passed for vibrating both conduits. A suitable drive signal is applied by meter electronics 350 to driver 304 via path 312.

Pick-off sensors 306 and 306' are affixed to at least one of conduits 303A and 303B on opposing ends of the conduit to measure oscillation of the conduits. As the conduit 303A–303B vibrates, pick-off sensors 306–306' generate a first pick-off signal and a second pick-off signal. The first and second pick-off signals are applied to paths 311 and 311'. The driver velocity signal is applied to path 310.

Temperature sensor 307 is affixed to at least one conduit 303A and/or 303B. Temperature sensor 307 measures the temperature of the conduit in order to modify equations for the temperature of the system. Path 311" carries temperature signals from temperature sensor 307 to meter electronics 350.

Meter electronics 350 receives the first and second pick-off signals appearing on paths 311 and 311', respectively. Meter electronics 350 processes the first and second velocity signals to compute the mass flow rate, the density, or other property of the material passing through flowmeter assembly 10. This computed information is applied by meter electronics 350 over path 375 to a utilization means (not shown). It is known to those skilled in the art that Coriolis flowmeter 300 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

In Coriolis flowmeter 300, the meter electronics 350 is physically divided into 2 components a host system 370 and a signal conditioner 360. In conventional meter electronics, these components are housed in one unit.

Signal conditioner 360 includes drive circuitry 363 and pick-off conditioning circuitry 361. One skilled in the art will recognize that in actuality drive circuitry 363 and pick-off conditioning circuitry 361 may be separate analog circuits or may be separate functions provided by a digital signal processor or other digital components. Drive circuitry 363 generates a drive signal and applies the drive signal to driver 304 via path 312 of path 320. In actuality, path 312 is a first and a second lead. Drive circuitry 363 is communicatively connected to pick-off signal conditioning circuitry 361 via path 362. Path 362 allows drive circuitry to monitor the incoming pick-off signals to adjust the drive signal. Power to operate drive circuitry 363 and pick-off signal conditioning circuitry 361 is supplied from host system 370 via a first wire 373 and a second wire 374. First wire 373 and second wire 374 may be a part of a conventional 2-wire, 4-wire cable, or a portion of a multi-pair cable.

Pick-off signal conditioning circuitry 361 receives input signals from first pick-off 305, second pick-off 305', and temperature sensor 307 via paths 311, 311' and 311". Pick-off circuitry 361 determines the frequency of the pick-off signals and may also determine properties of a material flowing through conduits 303A–303B. After the frequency of the input signals from pick-off sensors 305–305' and properties of the material are determined, parameter signals carrying this information are generated and transmitted to a secondary processing unit 371 in host system 370 via path 376. In a preferred embodiment, path 376 includes 2 leads. However, one skilled in the art will recognize that path 376 may be carried over first wire 373 and second wire 374 or over any other number of wires.

Host system 370 includes a power supply 372 and processing system 371. Power supply 372 receives electricity from a source and converts the received electricity to the proper power needed by the system. Processing system 371 receives the parameter signals from pick-off signal conditioning circuitry 361 and then may perform processes needed to provide properties of the material flowing through conduits 303A–303B needed by a user. Such properties may include but are not limited to density, mass flow rate, and volumetric flow rate.

In this embodiment, power supply 372 includes the circuitry of power supply 200 shown in FIG. 2. This allows power supply 372 to provide power meeting intrinsically safe limits to signal conditioner 360 which includes circuitry meeting intrinsically safe standards.

The above is a description of a power supply circuitry that has an integrated current source feedback and current limiting element in accordance with this invention. It is expected that those skilled in the art can and will design alternative systems that infringe this invention as set forth in the claims below either literally or through the Doctrine of Equivalents.

What is claimed is:

1. An intrinsically safe circuit configured for supplying power to a load connected to a first output terminal and a second output terminal, said circuit comprising:
   a power supply source;
   a voltage limiter connected in parallel with said power supply source to limit a maximum voltage generated by said power supply source;
   a connection between a first side of said voltage limiter and said first terminal; and
   a current limiter comprising;
      a reference voltage,
      a variable impedance,
      a barrier resistor, and
      a second side of said voltage limiter is connected in series with said barrier resistor and said variable impedance to said second output terminal,
      said current limiter limits a current delivered to said load via said terminals to a maximum current level in response to a comparison of said reference voltage with a voltage across said barrier resistor representative of the current delivered to said load.

2. The intrinsically safe circuit of claim 1 further comprises a fuse connected between a positive voltage side of the power supply source and the voltage limiting circuit.

3. The voltage limiter of claim 1 comprises a diode that has a cathode connected to the positive side of the power supply source and further has an anode connected to the negative side of the power supply source.

4. The voltage limiting circuit of claim 3 characterized in that the diode comprises a zener diode.

5. The current limiter and variable impedance of claim 1 comprises:
   said variable impedance comprises a transistor for controlling the current level through the load, said transistor is connected to the second output terminal;
   an operational amplifier that controls the impedance of the transistor and has an output connected to a gate of the transistor, and further has a first input connected to a voltage representing said load current and further has a second input connected to said reference voltage; and
   a voltage divider including said barrier resistor for generating a voltage level that is representative of said load current, said voltage divider is connected to the first input of the operational amplifier, and to the negative side of the power supply source.

6. The current limiter of claim 5 further comprises a resistor connected between the output of the operational amplifier and the gate of the transistor.

7. The current limiting circuit of claim 5 in which the transistor comprises a Metal Oxide Semiconductor Field Effect Transistor (MOSFET).

8. The current limiter of claim 5 in which the voltage divider comprises:
- a first resistor connected between the first input of the operational amplifier and drain of the transistor; and
- a second resistor having one end connected to said drain and a second end connected to the negative side of the power supply source.

9. The intrinsically safe circuit of claim 1 characterized in that the load comprises electronics of the Coriolis flowmeter having a signal conditioner circuit for generating a drive signal and for receiving pick-off signals, said signal conditioner circuit is connected to the first and second output terminals of the intrinsically safe circuit.

10. The signal conditioner circuit of claim 9 further comprising:
- a drive circuit for generating said drive signal, said drive circuit is connected to the first and second output terminals of the intrinsically safe circuit; and
- a conditioning circuit for receiving the pick-off signals, said conditioning circuit has an input connected to an output of the drive circuit.

11. A method of operating an intrinsically safe circuit for supplying power to a load, said method comprises the steps of:
- connecting a voltage limiter connected in parallel with a power supply source to limit a maximum voltage generated by said power supply source;
- extending a connection between a first side of said voltage limiter and a first terminal;
- connecting a second side of said voltage limiter in series with a barrier resistor and a variable impedance to a second output terminal; and
- limiting a current delivered to said load via said terminals to a maximum current level in response to a comparison of a reference voltage with a voltage across said barrier resistor representative of the current delivered to said load.

12. The method of claim 11 characterized in that the step of limiting the voltage level includes operating a diode to limit said voltage.

13. The method of claim 12, in which the step of operating a diode includes the step of operating a zener diode.

14. The method of claim 11 further comprises the steps of:
- applying intrinsically safe power from said terminal to a drive circuit of a Coriolis flowmeter; and
- generating a drive signal with the drive circuit in response to the reception of said power.

15. The method of claim 14 further comprises the step of applying pick-off signals to a conditioning circuit of said Coriolis flowmeter in response to the reception of said power.

16. The method of claim 11 characterized in that the step of limiting the current comprises the steps of:
- operating a voltage divider to generate a voltage level that is representative of the load current;
- operating the operational amplifier to compare a reference voltage with said voltage level representing the load current; and
- extending a signal from an output of the operational amplifier to a control input of a transistor for limiting a current to a maximum level through the load.

17. The method of claim 16 characterized in that the step of activating the transistor includes the step of operating a MOSFET.

* * * * *

UNITED STATES PATENT AND TRADEMARK OFFICE
CERTIFICATE OF CORRECTION

PATENT NO. : 6,381,114 B1 Page 1 of 1
DATED : April 30, 2002
INVENTOR(S) : William M. Mansfield It is certified that error appears in the above-identified patent and that said Letters Patent is hereby corrected as shown below:

Column 1,
Line 25, replace "circuit are limited to levels that prevent ignition of the" with
-- circuit are limited to levels that prevents ignition of the --

Column 4,
Line 67, replace "limiting circuit 103. In powersupply 100, average current" with
-- limiting circuit 103. In power supply 100, average current --

Column 10,
Line 32, replace "of activating the transistor includes the step of operating a"
with -- of actuating the transistor includes the step of operating a --

Signed and Sealed this

Eleventh Day of February, 2003

JAMES E. ROGAN
*Director of the United States Patent and Trademark Office*